United States Patent [19]

Westhead

[11] Patent Number: 4,476,902
[45] Date of Patent: Oct. 16, 1984

[54] IN-LINE PINTLE LOOP SEAM

[75] Inventor: William T. Westhead, Waycross, Ga.

[73] Assignee: Scapa Inc., Waycross, Ga.

[21] Appl. No.: 408,010

[22] Filed: Aug. 13, 1982

[51] Int. Cl.³ .......................... F16G 3/02; D21F 7/10
[52] U.S. Cl. .................................. 139/383 A; 28/141;
24/33 C; 162/DIG. 1; 245/10
[58] Field of Search ................... 139/383 A, 383 AA;
28/141; 112/262.1, 400, 441; 24/33 C, 31 H, 38,
39; 162/DIG. 1; 245/10

[56] References Cited

U.S. PATENT DOCUMENTS

| | | | |
|---|---|---|---|
| 2,158,007 | 5/1939 | Ellis et al. | 24/33 C |
| 2,879,580 | 3/1959 | Hindle. | |
| 4,103,717 | 8/1978 | Clark. | |
| 4,141,388 | 2/1979 | Romanski et al. | |
| 4,182,381 | 1/1980 | Gisbourne | 139/383 A |
| 4,244,084 | 1/1981 | Gisbourne | 139/383 A |
| 4,250,822 | 2/1981 | Fickers. | |
| 4,315,049 | 2/1982 | Fickers | 139/383 A |

FOREIGN PATENT DOCUMENTS 469336 7/1937 United Kingdom ............... 24/33 C

Primary Examiner—James Kee Chi
Attorney, Agent, or Firm—Fleit, Jacobson, Cohn & Price

[57] ABSTRACT

An in-line pintle seam for use with a pintle to join adjacent ends of a papermakers belt or the like and a method for producing such a seam. Basically, the seam comprises a spiral and a stuffer pick which are held in place by sewing the face ends of the papermakers belt around the spiral and stuffer pick and then between the center and back layers of the fabric in the case of a three-layer fabric. Once this part of the seaming is completed, the back ends are brought around the spiral and stuffer pick and sewn between the face and center layers of the fabric in much the same way as the face ends. Thus, the spiral and stuffer pick are held to the edge of the fabric by all of the warp yarns. In the case of a two-layer fabric, the ends are sewn back into the fabric between the face and back layers and are pulled through the fabric so that they appear on the back surface of the fabric. In each of the embodiments, all of the sewn back ends, either face or back, do not come out of the fabric in the same line, but are staggered so that a smooth taper and not a ridge is formed.

13 Claims, 17 Drawing Figures

FIG. 12
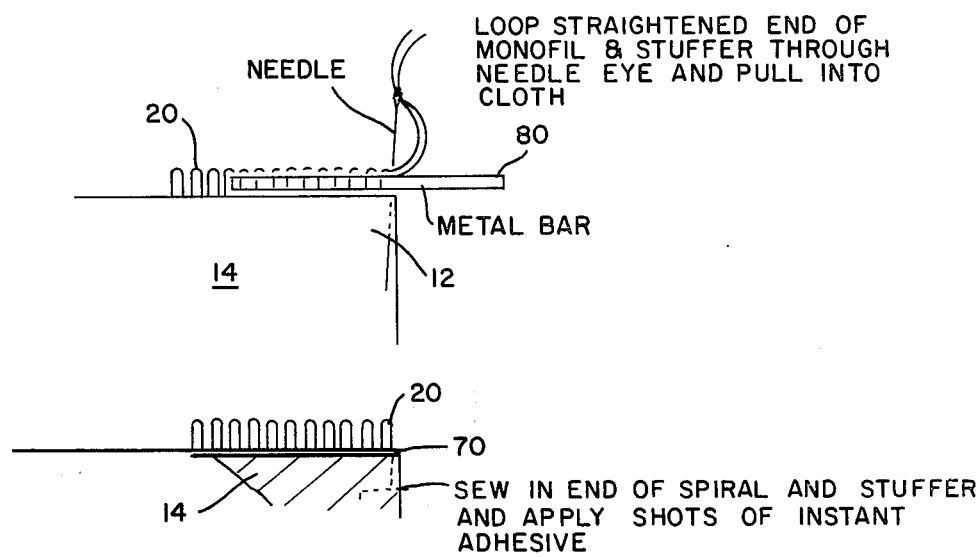
FIG. 13
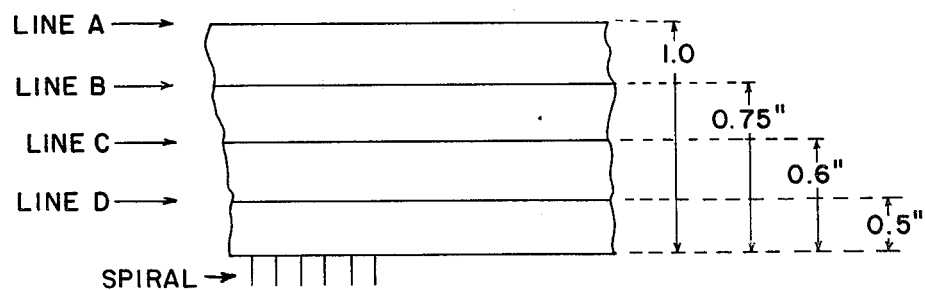
FIG. 16

IN-LINE PINTLE LOOP SEAM

BACKGROUND OF THE INVENTION

1. Field of the Invention

This invention relates to loop seams for use in joining the ends of a papermakers belt or the like.

2. Description of the Prior Art

In papermaking machines, a papermakers belt in the form of an endless belt-like structure is supported on and advanced by various machine rolls during the papermaking process. Papermakers belts carry various names depending on their intended use. By way of example, papermakers belts include forming fabrics, wet press felts, and dryer felts and fabrics. In most cases, the belt or fabric is joined at its ends to form an endless belt which is supported and controlled by various machine rolls associated with the papermaking machine.

The prior art employs various types of seams which are joined together through the use of a pintle in order to facilitate installation and removal of the papermakers belt from the papermaking machine. A very common type of seam is one employing metal clipper hooks arranged in an alternating relationship on either end of a papermakers belt to receive a pintle to join the ends of the belt together. The clipper hooks may be embedded directly into the ends of the belt, or may be secured to seam webbings which are in turn attached or secured to the ends of the belt through suitable stitching. U.S. Pat. No. 2,879,580 to Hindle is an example of metal hooks in webbing which, in turn, is stitched to the end of the belt.

Other types of arrangements for joining the ends of a papermakers belt include those in which the metal hooks are replaced by pintle receiving loops that are made from a synthetic material integral with the webbing for attachment to the ends of the belt as disclosed in U.S. Pat. No. 4,103,717 to Clark.

Yet another example is to form pintle receiving loops from the synthetic materials used to define the warp or machine direction yarns at either end of the fabric. Such seams are referred to as pin-type seams, one of which is shown in U.S. Pat. No. 4,141,388 to Romanski et al.

Still a further example is to create a seam for use in a papermaking fabric by inserting a seaming coil, removing picks in adjacent fabric areas, folding and sewing of such areas, creating a warp fringe beyond the seam area and weaving back portions of the fringe into the fabric body, Such a fabric is shown in U.S. Pat. No. 4,250,822 to Fickers.

Certain problems exist with each of the prior structures used to secure the ends of the various belts together. In some papermakers belts, the ends of the belt are joined in an abutting relationship and held that way through the use of clipper hooks inserted in a webbing, the whole of which is attached to the underside of the belt. Since the tension line of the seam is below that of the fabric, the seam tends to move upwardly so that both tension lines become coplanar. This in turn causes the abutting ends of the papermakers belt to press up against the paper sheet. When the paper sheet lies between a machine roll and the felt seam, the pressure between roll and seam increases thereby causing seam marking in the sheet, especially in the case of fine or critical grades of paper. Another problem associated with this type of seam occurs when the seam either makes or leaves the contact of a machine roll. The step caused by the sewn on webbing and the weight of the seam causes bouncing of the papermakers belt which leads to further marking of the paper sheet, paper sheet breaks, and a rapid weakening of the fabric structure in the seam area. Thread unraveling is a problem which occurs in papermakers belts in which the cut ends of the belt are exposed to either, or both, the paper sheet being formed, or the machine rolls. The last several threads in the cross machine direction at the end of a papermakers belt have the potential to become loose, a condition which may lead to further marking of the paper sheet.

Typically, in the case of a clipper seam that is attached to a papermakers belt, the sewing threads used to secure the seam to the ends of the belt are proud due to the typically hard and unyielding belt surface. Since the sewing threads are exposed on the surface of the belt and the surface of the seam, the threads are prone to wear, which ultimately leads to seam failure. The proud sewing threads can also cause paper marking problems.

In seams where loops are formed by reweaving certain of the fabric ends, certain problems exist. Certain of the fabric seams are slow to manufacture and are difficult to seam on the paper machine. In other seam types, the seam is held by sewing, which is susceptible to thread wear resulting in seam failure.

There is thus a need for a seam for joining the ends of a papermakers belt in which the chances of seam failure due to stitching failure and bounce are substantially reduced, the problem of unraveling is eliminated, and the problem of paper marking is severely curtailed. The present invention is directed toward filling that need.

SUMMARY OF THE INVENTION

The present invention relates to a seam for use with a pintle to join adjacent ends of a papermakers belt or the like. A method for producing such a seam also forms part of the present invention. The method both improves the production rate and permits easy joining of the fabric ends when installing the fabric on the papermaking machine.

When used in describing the seam, the terms "machine direction" and "cross machine direction" are applied to the seam in its position of intended use on a papermaking machine. Basically, the seam comprises a spiral and a stuffer pick which are held in place by sewing the face ends of the papermakers belt around the spiral and stuffer pick and then between the center and back layers of the fabric in the case of a three-layer fabric. Once this part of the seaming is completed, the back ends are brought around the spiral and stuffer pick, and sewn between the face and center layers of the fabric in much the same way as the face ends. Thus, the spiral and stuffer pick are held to the edge of the fabric by all of the warp yarns. All sewn back ends are brought out on the back side of the fabric.

In the case of a two-layer fabric, the ends are sewn back into the fabric between the face and back layers and are pulled through the fabric so that they again appear on the back surface of the fabric. In each of the embodiments, all of the sewn back ends, either face or back, do not come out of the fabric in the same line, but are staggered so that a smooth taper and not a ridge is formed.

It is thus an object of the present invention to provide an improved seam which substantially reduces the problems of paper marking.

It is another object of the present invention to provide a seam in which the problem of seam failure is substantially reduced.

It is a further object of the present invention to provide a seam which prevents the unraveling of the ends of the papermakers belt.

It is still an object of the present invention to provide a seam in which all of the elements constituting the seam are within the tension plane through the fabric thus eliminating pressure marking of the paper sheet.

It is yet another object of the present invention to provide a seam with a flat or tapered area, thus, eliminating the problems associated with the step area found in many prior art type seams.

It is yet a further object of the present invention to provide a seam constructed without the need for additional threads to be stitched into the seam area.

Additional objects of the present invention become apparent from a reading of the appended specification and claims in which preferred but not necessarily the only forms of the invention will be described in detail, taken in connection with the drawings accompanying and forming a part of the application.

BRIEF DESCRIPTION OF THE DRAWINGS

FIG. 12 is a schematic illustration used to explain the way in which a spiral end is sewn back into the fabric.

FIG. 13 is a schematic illustration used for the same purpose as FIG. 12.

FIG. 16 is a schematic illustration used to explain the way in which the fabric ends emerge on the back surface of a fabric having a full flexible weft and a weave pattern such as that shown in FIG. 15.

DETAILED DESCRIPTION OF THE DRAWINGS

Figure 1:
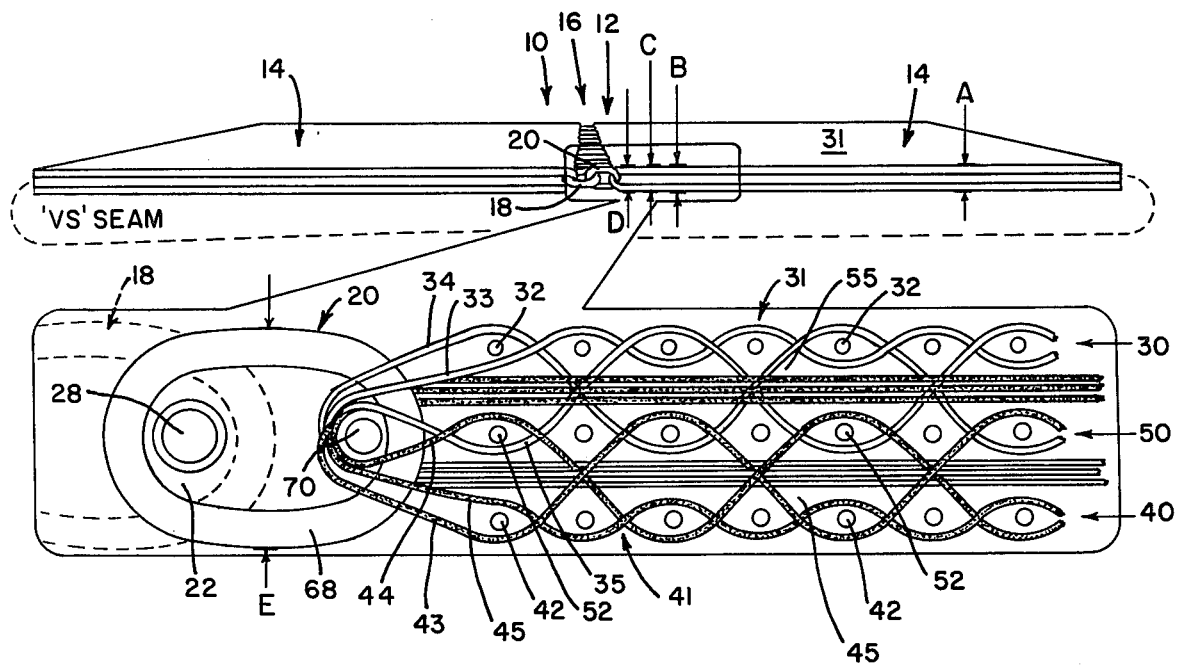
FIG. 1 is a partial perspective of a fabric incorporating the teachings of the subject invention with the portion of the fabric showing the seam loop detail being enlarged.
Figure 5:
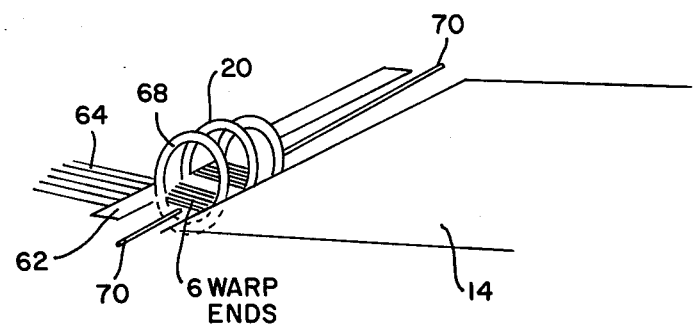
FIG. 5 is a perspective illustration, partially in schematic, of a spiral and stuffer pick being sewn into an end of a fabric in accordance with the teachings of the subject invention.

With reference to FIG. 1, a first embodiment of the subject invention is illustrated. FIG. 1 illustrates two ends 10 and 12 of a fabric 14 being joined together by a seam assembly generally designated as 16. The seam assembly basically comprises first and second spirals 18 and 20 intermeshed to define a pintle receiving shed 22. The spirals 18 and 20 are also secured to respective fabric ends 10 and 12 in a manner to be described in further detail hereinafter. With the insertion of a pintle 28 into the pintle receiving shed 22, the seam assembly is completed and the two fabric ends 10 and 12 are joined together so that fabric 14 is in the form of an endless belt.

With reference to FIGS. 1 through 13, the details of how each seam half is created will now be described. In the preferred embodiment, a three-layer fabric is provided. The three-layer fabric, generally designated as 14, includes a face surface 31 provided by a top or face layer 30 defined by a plurality of cross machine direction or weft yarns 32. The fabric also contains a back surface 41 provided by a bottom or back layer 40 defined by a plurality of cross machine direction or weft yarns 42. Finally, the fabric has an intermediate layer 50 defined by a plurality of cross machine direction or weft yarns 52. The fabric layers are held together by a plurality of face machine direction yarns or warp ends 33, 34 and 35 and a plurality of back machine direction yarns or ends 43, 44 and 45.

The weave pattern for the fabric has a six-end repeat in which yarns 33 through 35 and 43 through 45 constitute the six yarns of the repeat. As woven, face yarn 33 passes above and below adjacent cross machine direction yarns 32. The remaining face yarns 34 and 35 pass between face yarns 32 and intermediate yarns 52 in order to lock the face layer 30 to the intermediate layer 50. In like manner, back yarn 43 passes above and below adjacent cross machine direction or weft yarns 42, whereas the remaining two back ends 44 and 45 pass between cross machine direction yarns 42 and cross machine direction yarns 52. In this way, the back layer is locked to the intermediate layer by the back ends.

The details of how the seam is woven for the three-layer fabric will now be described. Preferably, the seam is made after the heat setting treatment, but before resin coating if the three-layer fabric is to be coated.

It is to be understood that the description which follows applies to each of the fabric ends 10 and 12 in order to create a seam half on each end. The seam halves are subsequently joined together through the use of the pintle 28 in order to create the final seam assembly.

After the three-layer fabric has been woven, the two ends 10 and 12, which are to be joined together, are identified. In order to determine the finished length of the fabric in the cross machine direction, the fabric is measured to a place on the fabric near each of the ends 10 and 12 where the spiral will be inserted. An additional length, in the case of the preferred embodiment, 8 inches, is allowed at both ends of the fabric. Another factor which comes into play is whether the final fabric is to be resin coated or not. In the case of an uncoated fabric, the fabric length between places where the spirals are to be inserted may be measured at the actual measurement. In the case of a resin coated fabric, the fabric length is measured at the desired ordered length between spirals less one-half of a percent. During resin treatment, the fabric is then pulled to the desired ordered length.

Figure 2:
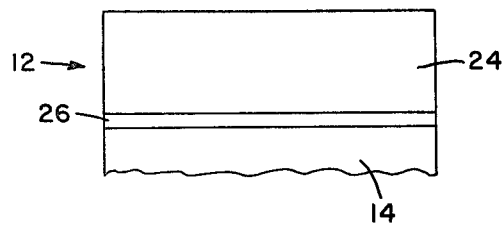
FIG. 2 is a schematic illustration used to explain a method for producing a fabric according to the subject invention.
Figure 3:
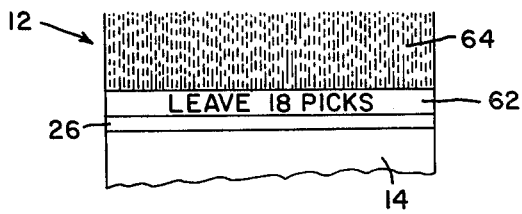
FIG. 3 is a schematic illustration used for the same purpose as FIG. 2.
Figure 4:
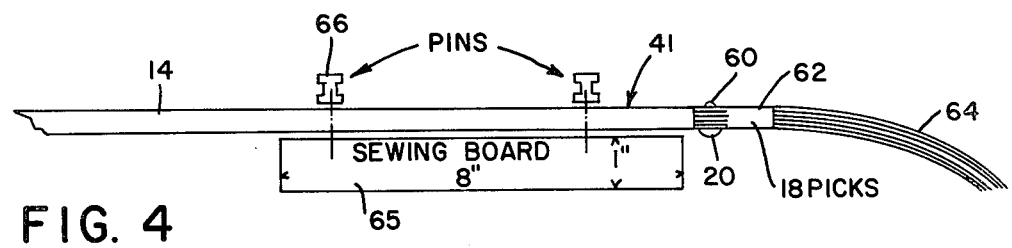
FIG. 4 is a schematic illustration showing a fabric mounted on a sewing board during production of the seam loop.
Figure 6:
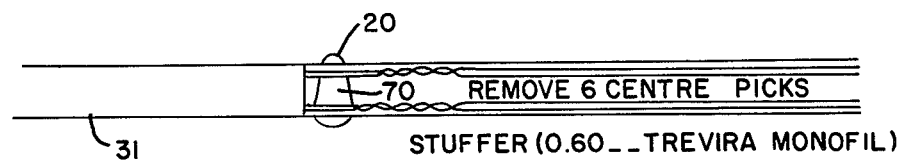
FIG. 6 is a schematic illustration of a fabric during one of the steps of the method for producing the fabric.

In the area 26 where the spiral is to be inserted as shown in FIG. 2, nine picks are removed, three adjacent cross machine direction yarns 32, 42 and 52 in each of the layers 30, 40 and 50. After this has been done, all of the warp ends are frayed by removing all of the cross machine direction yarns 32, 42 and 52 from the fabric end back toward the area where the spiral will be inserted as schematically illustrated in FIG. 3. Short of this area, six cross machine direction yarns or picks in each layer for a total of 18 are left so that there is a band 62 between the frayed ends 64 and the area 26 for spiral insertion.

With reference to FIGS. 1 and 4 through 6, the fabric 14 with the back surface up is pinned onto a conventional sewing board 65 by conventional pins 66. A spiral 20 is then inserted into the area 60 with the spiral being inserted so that there is one loop 68 for every six warp ends. The six center picks 52 are then removed from the band 62, and a stuffer pick 70 is pushed through. The six picks remaining in the face 30 and back 40 help to separate the face and back ends and simplify sewing.

Figure 7:
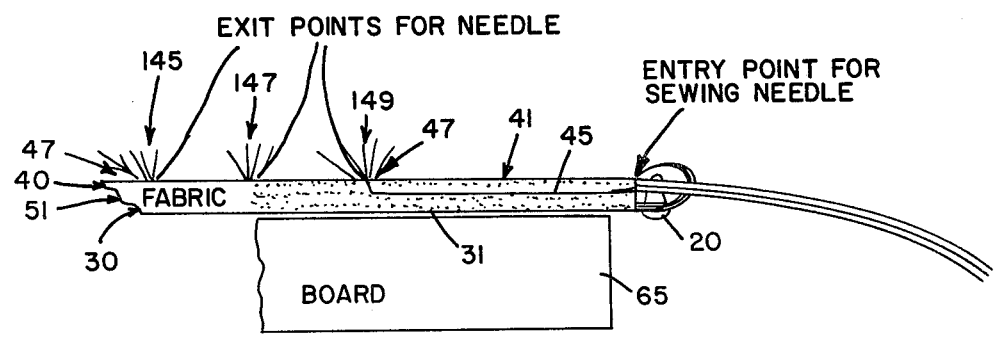
FIG. 7 is a schematic illustration similar to FIG. 4.
Figure 8:
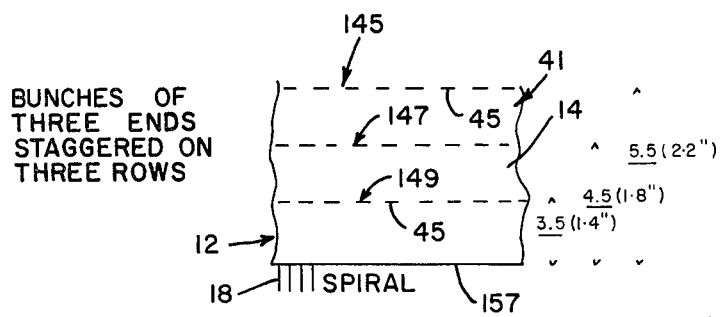
FIG. 8 is a schematic illustration showing the exit line pattern for face ends being sewn back into the fabric of FIG. 1.

The fabric is now ready for sewing. It is first necessary, however, to mark the fabric to indicate where the fabric ends will emerge from the inner structure of the fabric. This is because not all of the warp ends are brought out of the cloth on one line. To do this would form a ridge in the fabric which is undesirable. For each type of fabric in which the inventive seam is incorporated, the length of sewing is determined by the construction of the particular design pattern of the fabric as well as the length of the needle being used to accomplish the sewing. With the back surface 41 of the fabric face up on the sewing board, as shown in FIGS. 7 and 8 sewing begins by removing the six remainig face picks from band 62, taking three adjacent face ends and passing them around a spiral loop 68 of spiral 20. The needle is then passed straignt back through the spacing 45 defined between the back 40 and intermediate layers 50 after having entrapped the stuffer pick 70. Finally, the needle emerges from the back face of the fabric in the predetermined area 47. The three adjacent face yarns are then removed from the eye of the needle and are tensioned to pull them into the spiral. This process is known as "sewing back " and generally involves taking individual or groups of lengthwise (warp) threads and, by means of a needle, inserting them straight back into the body of the fabric between the layers of width direction (weft) threads.

In a preferred embodiment, maximum sew back and the first thread exit line 145 are determined by how far the needle can be pushed back into the fabric. The second thread exit line 147 is determined by counting a predetermined number of cross machine direction yarns toward the spiral (for example, 4, when only counting those yarns which define one of the surfaces of the fabric). If needed, a third and additional exit line 149 may be determined by further counting the predetermined number of cross machine direction yarns toward the spiral.

After all of the face yarns have been sewn back into the fabric in the manner just described throughout the width of the fabric, the back ends are then sewn into the fabric in much the same way as the face yarns were.

Figure 9:
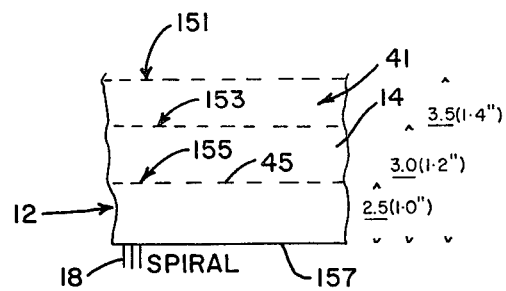
FIG. 9 is a schematic illustration of an exit line pattern for back ends being sewn back into the fabric of FIG. 1.
Figure 10:
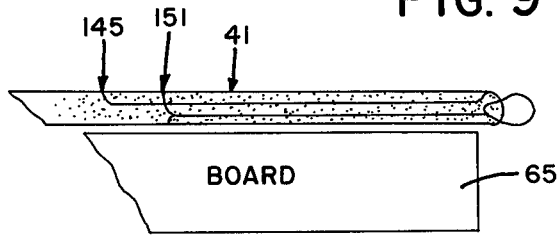
FIG. 10 is a schematic illustration showing the way in which the face and back ends emerge out of the back surface of the fabric in accordance with the teachings of the subject invention.

In the case of the back ends and with reference to FIGS. 9 and 10, the first two adjacent back yarns in the repeat are sewn into the fabric between the face and intermediate layers and emerge on the back at a predetermined location 151. The next back end in the repeat is sewn into the fabric between the back and intermediate layers and appears on the back surface at a second predetermined location 153. If needed, a third thread exit line 155 may be provided. This sewing of the back yarns is repeated over and over again with the single back yarn and pairs of back yarns appearing on the back surface at the predetermined locations which define lines across the width of the fabric. All of the back ends, both in pairs and alone, are drawn through the back surface in a staggered pattern such as that illustrated in FIG. 9. As in the case of the face yarns, the back ends should be tensioned evenly across the full width of the fabric. It is to be understood that the exit line pattern shown in FIG. 8 is for the face yarns emerging from the back surface, whereas the exit line pattern in FIG. 9 is for the back yarns emerging from the back surface. In a preferred embodiment as shown in FIG. 8, exit line 145 is set back about 5.5 cm. from the edge 157 of the fabric, exit line 147 is set back about 4.5 cm. and, if needed, exit line 149 is set back about 3.5 cm. As shown in FIG. 9, exit line 151 is set back about 3.5 cm. from the edge 157 of the fabric, exit line 153 is set back about 3.0 cm. and, if needed, exit line 155 is set back about 2.5 cm.

Figure 11:
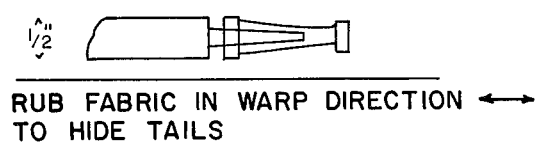
FIG. 11 is a schematic illustration to show how the tails are removed during production of a fabric embodying the teachings of the subject invention.

The tensions of both the face and back ends are adjusted to make the seam as straight as possible. The face and back yarns coming out of the exit points of the fabric are then trimmed off as close to the fabric surface as possible using a conventional cutter such as a nail clipper. The tails of the ends are then rubbed in using a metal "rubber," as schematically illustrated in FIG. 11. In order to accomplish this, the fabric is rubbed back and forth in the machine direction to smooth the tails.

The two seam halves are then linked together on a stretcher with the center line of the fabric being correctly aligned. Center line alignment is facilitated by providing a colored center line on the face and the back of the fabric. After this has been accomplished, the fabric is trimmed to the required width. The spiral 20 and the stuffer pick 70, however, are not trimmed. After the fabric has been trimmed, the edges are sealed in a conventional manner, such as by heat sealing and application of a suitable adhesive, for example, a flexible rubber adhesive compound such as Pliobond adhesive, a product of Goodyear Tire & Rubber Company.

With reference to the schematic illustrations in FIGS. 12 and 13, the ends of the spiral 20 and the stuffer pick 70 must now be locked into the fabric. This is done by sewing back the ends of the spiral and the stuffer pick into the fabric. To do so, it is necessary to insert a suitably shaped bar 80 into the spiral. The bar is shaped and of sufficient size to occupy the interior of the spiral and to prevent pulling of the spiral out of shape as the spiral end is being sewn into the fabric. This procedure has been found to be quite advantageous when using a polyester monofilament spiral.

When using a nylon coated stainless steel spiral, a modification to the way the back and face ends are sewn into the fabric is necessary. This is because the spiral is so easily deformed. If all six ends (three back ends and three face ends of a repeat) are sewn around the loop of the spiral, then the spiral becomes so deformed that it will not mesh with the other spiral. One way to prevent this is to sew only three ends around each spiral loop and three ends around the stuffer pick only. In a preferred way of doing this, the three face ends of a repeat are sewn in the manner previously described. The three back ends of the repeat, however, are sewn in the manner described except that they no longer go around the spiral but only around the stuffer pick.

In summary, for each of the seam halves, the spiral and stuffer pick are held in place by first sewing the three face ends of a design repeat around the spiral and stuffer pick and then between the center and back layers of the fabric. Once this part of the seaming is completed, the three back ends of the design repeat are brought around the spiral and stuffer pick and sewn between the face and center layers of the fabric. Thus, the spiral and the stuffer pick are held to the edge of the fabric by all six warp yarns in each design repeat. Further, it should be noted that all of the sewn back ends do not come out of the back of the fabric in the same line, but are staggered so that a smooth taper and not a ridge is formed.

In a three-layer fabric produced according to the subject invention, michrometer measurements of the spiral and fabric thickness revealed the following. The basic three-layer fabric employed had a thickness A of 0.124 inches. At a distance 2 inches from the edge of the seam, the fabric thickness B was on the order of 0.154 inches. At 1 inch from the edge, the fabric thickness C was 0.178 inches. At the seam edge, the fabric thickness D was 0.197 inches. In the embodiment under consideration, the spiral had a thickness E of 0.161 inches. These figures illustrate the tapering nature of the seam; it should be noted that the thickness of the spiral is less than that of the seam edge, thus, the spiral is within the top and bottom surface planes of the fabric at the seam.

In selecting a spiral, it is desirable to have the spiral made of the heaviest diameter material while still keeping the spiral below the thickness of the fabric at the seam edge. In a preferred embodiment, a spiral having a diameter of approximately 0.9 millimeters has been found to give excellent results. Such a spiral has a spiral length of approximately 0.311 millimeters and a spiral height of approximately 0.161 millimeters. At the same time, the interior dimensions of the spiral are such that the interior length is approximately 0.256 millimeters, whereas the interior height is approximately 0.091 millimeters.

In selecting a pintle, it should be one which allows the seam to freely pivot at the joining point. Too large a pintle would cause problems at seaming and force the spiral loops to lie proud on the surface planes of the fabric. It has also been found desirable to use an elliptical shaped spiral as opposed to one which has a generally rectangular interior configuration.

Figure 14:
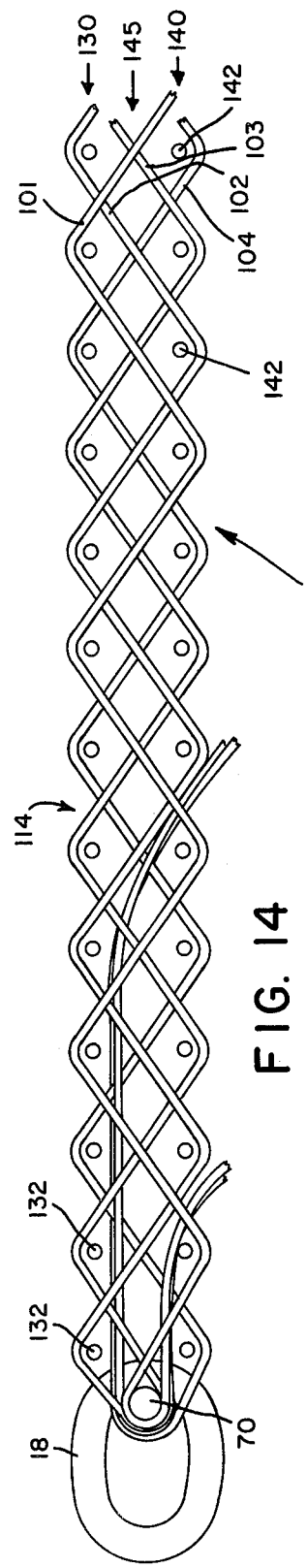
FIG. 14 shows another embodiment of the subject invention in the form of a duplex fabric.

With reference to FIG. 14, incorporation of the subject invention into a duplex fabric will now be described. One such duplex fabric is illustrated in FIG. 14, where the fabric contains a face layer 130 defined by a plurality of cross machine direction yarns 132 and a back layer 140 defined by a plurality of cross machine direction yarns 142. The two layers are joined together by a plurality of machine direction yarns 101 through 104. In this type of duplex fabric, the four yarns 101 through 104 constitute a design repeat.

The basic design of the seam is similar to that of the three-layer fabric in that the spiral 18 and stuffer pick 70 are held in place by first sewing the face ends around the spiral and stuffer pick and then between the face and back layers of the fabric. Once this part of the seam is completed, the back ends are brought around the spiral and stuffer pick and then between the same face and back layers of the fabric. There are, however, differences in the technique of making the seam for the duplex fabric 114 and the three-layer fabric 14 of FIG. 1. In the three-layer fabric, the weave repeat may be based on six ends at 42 ends per inch, all of which hold the spiral in place—three ends sewn between the face and center layers 30 and 50, and three ends sewn between the center and back layers 50 and 40. This results in seven spirals per inch. The weave for the duplex fabric of FIG. 14 may be based on four ends at 48 ends per inch. If the individual spiral loops are held by the four ends in each repeat, this would give 12 spirals per inch which is too dense. For this reason, each spiral loop is held with eight ends of two repeats, thereby giving six spiral loops per inch.

Because the fabric of FIG. 14 is a duplex fabric, it is necessary to sew all of the fabric ends into the single space 145 between the two fabric layers. It has been found that sewing back eight ends is exceedingly difficult. It has also been observed that, by sewing back the eight ends, fabric thickness is increased at the seam area to a level which is considered to be unacceptable. Not only is the seam area too thick and too bulky, but it is also markedly stiffer than the rest of the fabric. For this reason, a preferred permissible level of ends holding a spiral loop is six with the other two ends being cut out of the fabric during the seam making operation.

The seam may be installed on a heat stabilized but not resin treated fabric. Once the whole fabric has been seamed, the fabric and seam may be resin treated.

The seam is made after heat stabilizing the fabric but before resin coating. As in the case of the three-layer fabric, the fabric length is measured less one-half percent to the place where the spiral will be inserted. Then an additional 8 inches at either end is allowed for sew back. It is desirable that the fabric be at the preferred width prior to introduction of the spiral.

At the area where the spiral is to be inserted, six picks are removed for spiral insertion. Three adjacent picks 132 are removed from the face layer 130 and three adjacent picks 142 are removed from the back layer 140.

The fabric ends are then fringed out by removing the cross machine direction yarns 132 and 142 in both layers but leaving a 12-pick band immediately next to the area where the spiral is to be inserted. By 12 picks, it is meant that there will be six adjacent face yarns 132 and six adjacent back yarns 142. The stuffer pick 70 placed behind the spiral is now inserted onto the fabric.

It then becomes necessary to remove a certain number of the warp ends to avoid spiral crowding. In the preferred embodiment, this is done by counting 20 face picks back into the fabric. At the twentieth pick, every alternate warp end is cut at the point where it crosses the pick. The cut warp end is then removed by pulling it out of the fabric.

The fabric is now ready for sewing. This is done by placing the back surface 141 face up. The back surface is then marked back from the edge to the points where the various ends 101–104 will emerge from the fabric surface after being sewn into the intermediate portion between the back and face layers. As pointed out before, all of the ends are not brought out of the back of the fabric on one line, thus, preventing ridging.

The ends are then sewn back into the center of the fabric in two groups of three ends per spiral loop with the three ends emerging from the back of the fabric on alternate lines which are spaced from each other. As with the three-layer fabric, the tension of the ends are adjusted so that the seam is as straight as possible. The ends are trimmed off as close as possible to the fabric surface using nail clippers. As before, the tails are rubbed using a metal rubber. The ends of the spirals and stuffer picks are sewn back into the cloth as described previously.

Figure 15:
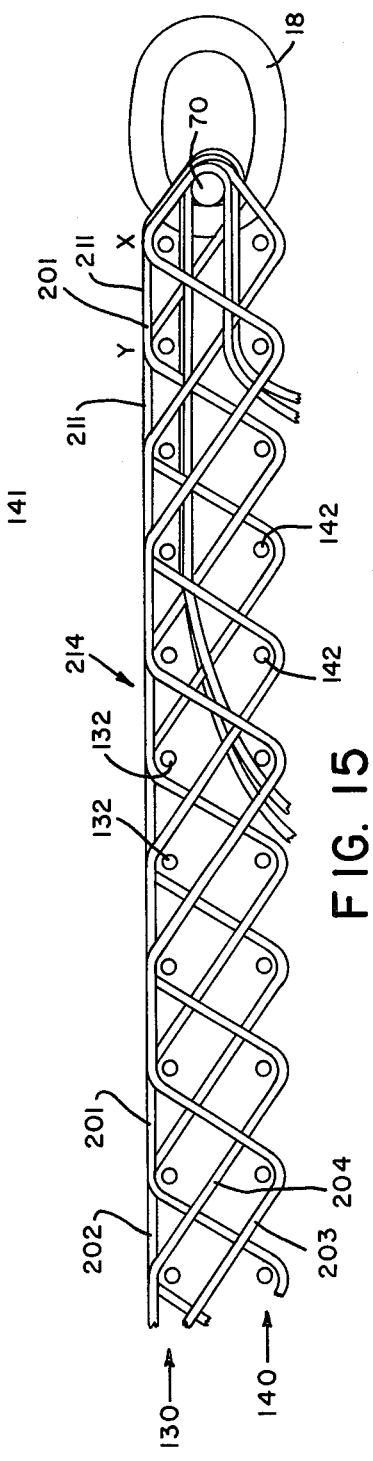
FIG. 15 shows yet another embodiment of the subject invention in an alternative duplex fabric.

Yet another embodiment of a duplex fabric 214 incorporating the subject invention is illustrated in FIG. 15. This embodiment differs from the other duplex fabric shown in FIG. 14 in the way in which the machine direction yarns 201-204 are woven to join the two fabric layers 130 and 140. In the duplex fabric 214 of FIG. 15, each warp yarn 201-204 spans two adjacent top layer weft yarns 132 in order to produce a series of two floats 211 across the face of the fabric. For this reason, the technique for making the in-line seam on this type of fabric is exactly the same as for the other duplex fabric with one exception. After having counted 20 picks back into the fabric, it is necessary to ensure that the warp ends crossing the twentieth pick are cut at the point that they appear on the surface of the fabric, thereby avoiding any cut end tail. This may be seen with reference to FIG. 15. As shown, warp yarn 201 is to be cut. If the warp end is cut at X, then the length from X to Y is a loose end of the surface of the fabric. This could lead to paper marking. For this reason, it is more appropriate to cut the warp end at Y.

Table 1 shows michrometer measurements of a fabric thickness compared with thickness in the seam area for both of the duplex fabrics of FIGS. 14 and 15.

TABLE NO. 1

|  | FIG. 14 FABRIC | FIG. 15 FABRIC |
|---|---|---|
| Basic Fabric Thickness A | 0.103" | 0.091" |
| Fabric Thickness B 1" from seam | 0.130" | 0.124" |
| Fabric Thickness C at seam | 0.147" | 0.145" |
| Spiral Thickness D | 0.134" | 0.134" |

As can be seen, these figures illustrate the tapering nature of the seam, which is equidivided between the face and back surfaces. It should also be noted that the thickness of the spiral is less than that of the seam edge, thereby ensuring that the spiral is constantly below the plane of the fabric at the seam.

Initially, a spiral of the same dimensions as used in the three-layer fabric was applied to the duplex fabric. It was found, however, that while the spiral was satisfactory for the three-layer fabric, it tended to stand proud on the planes of the duplex fabrics. It was, therefore, necessary to find a smaller spiral. One such spiral which proved to be successful has the following characteristics: The spiral diameter is 0.8 mm, the spiral length measured internally is 0.235 inch, and externally is 0.299 inch, and the spiral height measured internally is 0.070 inch, and externally is 0.134 inch. The spiral is made from hydrolysis resistant polyester monofil. The cable of the spiral should be relatively free to allow the seam to pivot. One such cable which has been found to meet these requirements is that manufactured by Engineered Yarns and has a 0.048 diameter with a monofilament core, a Nomex cover and is resin treated.

The technique for inserting the seam onto a duplex fabric employing relatively soft flexible weft yarns, such as those made from a spun synthetic, utilizes four ends of sewing holding each spiral, with the other four ends tucked through from face to back of the fabric between each spiral loop in order to anchor them. At 48 ends per inch, this gives six spirals per inch in the finished seam. This technique also eliminates the need to cut ends out of the fabric as described earlier.

As is known, soft flexible weft is fuller than a more stiff weft such as a synthetic monofilament or a resin treated yarn, and therefore any gap between face and back picks would not be as pronounced in a fabric employing the soft flexible weft yarns, making the fabric more difficult to sew. Further, it has been noted that on heat set, but nonresin treated fabrics, there is little resistance to distortion of the fabric edge as a sewing needle is pushed therethrough. For these two reasons, it is clear that more pressure is necessary to insert the needle into and through the gap which in turn increases distortion of the fabric edge. Prior observations showed that the seam became very wavey and uneven.

In an attempt to increase the resistance of the fabric edge to distortion, the fabric was treated with a resin prior to insertion of the seam. While this treatment did increase the resistance to distortion, it also markedly increased the resistance to insertion of the needle. This increased resistance to the needle more than offset the increased resistance to distortion and it became evident that a nonresin treated solution would be preferable. Further attempts were made to use needles where the eye is just back of the needle point. This approach was also unsuccessful in that the needles were either too thin and broke or were too large to insert. Finally, it was found that by sewing back the ends to work the needle up and down in a sewing manner within the center plane of the fabric produced a desirable result. This was particularly the case when sewing back the second group of three ends as the space availability was already partly filled by the first group of three ends.

The method used to produce a fabric having a full flexible weft and the weave arrangement of FIG. 15 is as follows. As with the duplex fabrics of FIGS. 14 and 15, the twentieth pick back from the spiral was located, and every alternate warp end crossing that pick cut and removed by pulling them out of the fabric. The fabric ends were then sewn back into the center of the fabric in groups of three per spiral. The ends were pulled down to make the seam as straight as possible and then clipped off. It was observed that pulling down closed up the picks at the location of the spiral. Therefore, one pick was removed after the pull down operation was completed. In case of a resin treated fabric, the fabric was reinstalled on the treatment machine and treated with the appropriate resin concentration. Table 2 lists michrometer measurements of fabric thickness for an embodiment of a full flexible weft fabric having a weave pattern such as shown in FIG. 15.

TABLE 2

|  | SOFT FLEXIBLE WEFT FABRIC |
|---|---|
| Basic Fabric Thickness | 0.091" |
| Fabric Thickness 1" from seam | 0.117" |
| Fabric Thickness at seam | 0.150" |
| Spiral Thickness | 0.134" |

These figures again illustrate the seam taper as was found in all prior embodiments.

An alternative embodiment of the seam may be made in the following manner. The seam is made after heat stabilizing the fabric, but before resin coating. As was done in all previous cases, the fabric length is measured less one-half percent to the places where the spiral will be inserted. Then, an additional 8 inches is allowed for fringing and sew back. Six picks are removed for spiral insertion, three face and three back. The spiral is then positioned about the space created and the stuffer pick is inserted behind the spiral to hold the spiral in place. The edge of the fabric is fringed out by removing the weft yarns but leaving 12 picks immediately next to the spiral. The fabric is now ready for sewing.

The face end side of the fabric is laid on the table and the lengths to which the sewing will go is marked. The first group of four ends are brought out of the back side alternately at lines A and B in FIG. 16. Similarly, the second group of four ends are brought out at lines C and D. This prevents ridging in the seam area.

Now the back ends are sewn back into the center of the fabric in groups of four ends per spiral loop to lines A and B. The face ends are sewn back into the center of the fabric in groups of four ends between each spiral loop to lines C and D. The tensions of each group of ends are adjusted on pull down to make the seam as straight as possible. The ends are trimmed off as close as possible to the back surface of the fabric using the nail clippers. The tails of the ends are rubbed with the metal rubber to smooth out the cut off ends. The ends of the spirals and stuffer picks are locked in place by sewing back in the manner described with reference to the three-layer fabric. The fabric is then resin treated with the required percentage resin concentration. The tension during the drying operation is kept at a minimum to prevent any possibility of lengthening the fabric.

Figure 17:
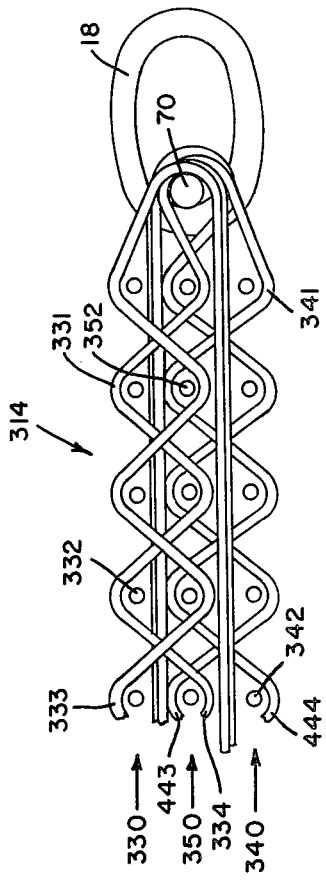
FIG. 17 is still another embodiment of a fabric produced according to the subject invention.

Yet another embodiment of a three-layer fabric incorporating the subject invention is shown in FIG. 17. The three-layer fabric, generally designated as 314, includes a face surface 331 provided by a top or face layer 330 defined by a plurality of cross machine direction or weft yarns 332. The fabric also contains a back surface 341 provided by a bottom or back layer 340 defined by a plurality of cross machine direction or weft yarns 342. Finally, the fabric has an intermediate layer 350 defined by a plurality of cross machine direction or weft yarns 352. The fabric layers are held together by a plurality of face machine direction yarns or warp ends 333 and 334 and a plurality of back machine direction yarns or ends 443 and 444.

The weave pattern for the fabric has a four-end repeat in which yarns 433, 435, 443 and 445 constitute the four yarns of the repeat. As woven, face yarns 433 and 434 pass between face yarns 332 and intermediate yarns 352 in order to lock the face layer 330 to the intermediate layer 350. In like manner, back yarns 343 and 344 pass between cross machine direction yarns 342 and cross machine direction yarns 352. In this way, the back layer is locked to the intermediate layer by the back ends.

The basic design of the seam for this fabric is similar to those dealing with the other embodiments already described. The spiral 18 and stuffer pick 70 are held in place by warp ends which are sewn around the spiral and stuffer pick, then back into the fabric, coming out of the back side of the fabric. The fabric of FIG. 17 may contain as many as 48 ends per inch. If the spiral is inserted every eight ends, the result is six spirals per inch of the fabric. The alternative is to insert the spiral every four ends resulting in 12 spirals per inch. This density of spiral, however, is too great and prevents easy joining of the seam.

In order to maintain the characteristics of the face of the fabric, all of the sewn back ends are brought out of the back of the fabric. When seaming fabrics, eight ends were sewn back for each spiral. The combination of face warp and back warp, both of which contain large quantities of spun yarn, make the sew back area very bulky. It was observed that a 3+3 level of sew back was the maximum permissible but even this was somewhat bulky. Finally, the sew back was done by sewing six ends per spiral in pairs, each pair exiting the fabric on a staggered basis. Based on this 2+2+2 sew back, fabrics with endages as high as 48 per inch were successfully seamed.

Thus, it can be seen that a seam made according to the teachings of the present invention provides a seam in-line with the tension plane through the fabric. This feature is a direct result of sewing back the warp threads of the fabric in between the layers of the fabric. When the fabric is placed on a papermakers machine it is stretched and a plane of tension through the fabric can be identified. The seam, which is thicker than the fabric, also has a plane of tension associated with it. By sewing the warp threads back into the middle of the fabric, the tension plane of the resulting seam wil be generally in line with the tension plane of the fabric. This eliminates pressure marking of the paper sheet. Further, it is observed that the fabric does not have a step area as found in other nonmetallic type seams. Thus, any increase in thickness in the seam area is tapered as opposed to being stepped. Further, there is no sewing on the sewn area which eliminates a source of seam failure. The seam may be made on a multilayer fabric that is one having two or more layers. In addition, the fabric can be made of a variety of warp and/or weft yarns. Appropriate yarns are spun yarns, continuous filament yarns and monofilament yarns or combinations thereof.

Although the present invention has been shown and described in terms of a specific preferred embodiment, it will be appreciated by those skilled in the art that changes or modifications are possible which do not depart from the inventive concepts described and taught herein. For example, although it is preferred to have all of the sewn back ends come out of the back side of the fabric, it is nevertheless contemplated that the sewn back ends could come out of both the face and back sides of the fabric. In this case, the staggered pattern for the front and back ends is determined in a manner similar to the case where all of the ends come out of the back side of the fabric, it being the purpose to divide the ends evenly between the face and back sides. For the fabric of FIG. 1, this can be accomplished by bringing the back yarns out of the face side of the fabric in accordance with the exit line pattern of FIG. 9. However, having ends emerge on the face side of the fabric is less preferred because of the potential marking problem and the added requirement that the fabric be turned over. Such changes and modifications are deemed to fall within the purview of these inventive concepts.

What is claimed is:

1. A papermakers fabric having two ends joined together by a seam, said fabric comprising:
   a first layer defined by a first plurality of weft yarns;
   a second layer defined by a second plurality of weft yarns;
   a plurality of warp yarns interwoven with said weft yarns to define a first surface on said first layer and a second surface on said second layer, a select number of said warp yarns extending out of each end of said fabric;

a first spiral coil and a first stuffer pick disposed across said warp yarns at one end of said fabric; and said select number of warp yarns being sewn back directly into the fabric between said first and second layers after passing around elected portions of at least one of said spiral coil and said stuffer pick, whereby all the elements constituting the seam are generally in line with the tension plane through the fabric.

2. The fabric of claim 1, further comprising an intermediate layer between said first and second layers and defined by a third plurality of weft yarns.

3. The fabric of claim 2, wherein said select number of warp yarns are sewn back into the fabric between either said first and intermediate layers or said second and intermediate layers.

4. The fabric of claim 2, wherein said select number of warp yarns are sewn back into the fabric alternately between said first and intermediate layers, and said second and intermediate layers.

5. The fabric of claim 1, wherein said select number of warp yarns, after being sewn back, emerge from exit points on at least one of said first and second surfaces.

6. The fabric of claim 1, wherein said first surface defines the face of said fabric and said second surface defines the back of said fabric, and wherein said select number of warp yarns, after being sewn back, emerge from exit points on the back of said fabric.

7. The fabric of claim 1, further comprising a second spiral coil and a second stuffer pick, both being disposed across said warp yarns at the other end of said fabric; and a second select number of said warp yarns extend out of said other end and are sewn back into the fabric between said first and second layers after passing around selected portions of at least one of said second spiral coil and said second stuffer pick.

8. The fabric of claim 7, further comprising an elongated pintle inserted into a space created when said first and second spiral coils are arranged in an interdigitated manner, said first and second spiral coils having an outside diameter less than the thickness of the fabric ends at the seam.

9. The fabric of claim 5, wherein said exit points are arranged as a staggered pattern across a predetermined area of at least one of said first and second surfaces, thereby creating a tapering effect on the ends of said fabric.

10. A method of producing a seam in a multiple layer papermakers fabric comprising the steps of:

determining the place on the fabric where a spiral coil is to be inserted;

removing a predetermined number of weft yarns in each layer of the fabric at said place;

fraying out the ends of the fabric by removing a predetermined number of weft yarns and temporarily leaving a certain number of weft yarns immediately next to the area where the spiral is to be inserted;

taking a predetermined number of the warp yarns of a design repeat, passing them around the spiral, and sewing them directly into the fabric between the face and back layers of the fabric, thereby protecting said warp yarn from wear and eliminating a source of seam failure; and causing the sewn back warp yarns to emerge from exit points on at least one of the face and back surfaces of the fabric.

11. The method of claim 10, further comprising the steps of inserting a stuffer pick at the same place on the fabric that the spiral coil is located, and passing a select number of the warp yarns around the stuffer pick before the warp yarns are sewn back into the fabric.

12. The method of claim 10, further comprising the step of arranging said exit points in a staggered pattern across a predetermined area of at least one of said first and second surfaces, thereby creating a tapering effect on the ends of said fabric.

13. The method of claim 10, further comprising the steps of designating one of the surfaces of the fabric as the back surface, and arranging said exit points in a staggered pattern across a predetermined area of the back surface.

* * * * *

UNITED STATES PATENT AND TRADEMARK OFFICE
CERTIFICATE OF CORRECTION

PATENT NO. : 4,476,902

DATED : October 16, 1984

INVENTOR(S) : William T. WESTHEAD

It is certified that error appears in the above-identified patent and that said Letters Patent is hereby corrected as shown below:

Claim 1, column 13, line 5:

Change "elected" to -- selected --.

Signed and Sealed this

Sixth Day of October, 1987

Attest:

DONALD J. QUIGG

*Attesting Officer*　　　　　*Commissioner of Patents and Trademarks*